(12) United States Patent
Raichelgauz et al.

(10) Patent No.: US 12,049,116 B2
(45) Date of Patent: Jul. 30, 2024

(54) CONFIGURING AN ACTIVE SUSPENSION (71) Applicant: AUTOBRAINS TECHNOLOGIES LTD, Tel Aviv (IL)

(72) Inventors: Igal Raichelgauz, Tel Aviv (IL); Karina Odinaev, Tel Aviv (IL)

(73) Assignee: AUTOBRAINS TECHNOLOGIES LTD, Tel Aviv-Jaffa (IL)

( * ) Notice: Subject to any disclaimer, the term of this patent is extended or adjusted under 35 U.S.C. 154(b) by 296 days.

(21) Appl. No.: 17/449,443

(22) Filed: Sep. 29, 2021

(65) Prior Publication Data
US 2022/0097474 A1 Mar. 31, 2022

Related U.S. Application Data

(60) Provisional application No. 63/198,164, filed on Sep. 30, 2020.

(51) Int. Cl.
*B60G 17/0165* (2006.01)
*G06N 20/00* (2019.01)

(52) U.S. Cl.
CPC ...... *B60G 17/0165* (2013.01); *B60G 2400/80* (2013.01); *B60G 2400/90* (2013.01); *G06N 20/00* (2019.01)

(58) Field of Classification Search
CPC ........... B60G 17/0165; B60G 2400/80; B60G 2400/90; B60G 2400/204; B60G 2400/821; B60G 2400/823; B60G 2600/182; B60G 2600/1877; B60G 2800/162; B60G 2800/916; G06N 20/00
See application file for complete search history.

(56) References Cited

U.S. PATENT DOCUMENTS

| | | |
|---|---|---|
| 4,601,395 A | 7/1986 | Juvinall et al. |
| 4,733,353 A | 3/1988 | Jaswa |
| 4,932,645 A | 6/1990 | Schorey et al. |

(Continued)

FOREIGN PATENT DOCUMENTS

| | | |
|---|---|---|
| AU | 2007201966 B2 | 2/2010 |
| CN | 101539530 A | 9/2009 |

(Continued)

OTHER PUBLICATIONS

Theodoropoulos et al, "Simulating Asynchronous Architectures on Transputer Networks", Proceedings of the Fourth Euromicro Workshop On Parallel and Distributed Processing, 1996. PDP '96, pp. 274-281.

(Continued)

*Primary Examiner* — Joseph J Dallo
(74) *Attorney, Agent, or Firm* — Reches Patents (57) ABSTRACT

A method for configuring a configurable suspension, the method may include obtaining acquired sensed information that represent (a) one or more driving parameters of the vehicle, (b) one or more vehicle cabin disturbance parameters, (c) a configuration of a configurable suspension, and (d) a road segment that precedes the vehicle; selecting, out of multiple configurations of the configurable suspension, a selected configuration that one applied will attribute to obtain a desired human-in-vehicle comfort value; and triggering or requesting a setting of the configurable suspension to a configuration of the one or more configurations.

15 Claims, 3 Drawing Sheets

(56) References Cited

U.S. PATENT DOCUMENTS

| | | |
|---|---|---|
| 4,972,363 A | 11/1990 | Nguyen et al. |
| 5,078,501 A | 1/1992 | Hekker et al. |
| 5,214,746 A | 5/1993 | Fogel et al. |
| 5,307,451 A | 4/1994 | Clark |
| 5,369,773 A | 11/1994 | Hammerstrom |
| 5,412,564 A | 5/1995 | Ecer |
| 5,436,653 A | 7/1995 | Ellis et al. |
| 5,568,181 A | 10/1996 | Greenwood et al. |
| 5,638,425 A | 6/1997 | Meador, I et al. |
| 5,745,678 A | 4/1998 | Herzberg et al. |
| 5,754,938 A | 5/1998 | Herz et al. |
| 5,763,069 A | 6/1998 | Jordan |
| 5,806,061 A | 9/1998 | Chaudhuri et al. |
| 5,835,087 A | 11/1998 | Herz et al. |
| 5,835,901 A | 11/1998 | Duvoisin et al. |
| 5,852,435 A | 12/1998 | Vigneaux et al. |
| 5,870,754 A | 2/1999 | Dimitrova et al. |
| 5,873,080 A | 2/1999 | Coden et al. |
| 5,887,193 A | 3/1999 | Takahashi et al. |
| 5,926,812 A | 7/1999 | Hilsenrath et al. |
| 5,978,754 A | 11/1999 | Kumano |
| 5,991,306 A | 11/1999 | Burns et al. |
| 5,999,637 A | 12/1999 | Toyoda et al. |
| 6,052,481 A | 4/2000 | Grajski et al. |
| 6,070,167 A | 5/2000 | Qian et al. |
| 6,076,088 A | 6/2000 | Paik et al. |
| 6,122,628 A | 9/2000 | Castelli et al. |
| 6,128,651 A | 10/2000 | Cezar |
| 6,137,911 A | 10/2000 | Zhilyaev |
| 6,144,767 A | 11/2000 | Bottou et al. |
| 6,147,636 A | 11/2000 | Gershenson |
| 6,163,510 A | 12/2000 | Lee et al. |
| 6,243,375 B1 | 6/2001 | Speicher |
| 6,243,713 B1 | 6/2001 | Nelson et al. |
| 6,275,599 B1 | 8/2001 | Adler et al. |
| 6,314,419 B1 | 11/2001 | Faisal |
| 6,329,986 B1 | 12/2001 | Cheng |
| 6,381,656 B1 | 4/2002 | Shankman |
| 6,411,229 B2 | 6/2002 | Kobayashi |
| 6,422,617 B1 | 7/2002 | Fukumoto et al. |
| 6,459,991 B1 | 10/2002 | Takiguchi et al. |
| 6,507,672 B1 | 1/2003 | Watkins et al. |
| 6,523,046 B2 | 2/2003 | Liu et al. |
| 6,524,861 B1 | 2/2003 | Anderson |
| 6,546,405 B2 | 4/2003 | Gupta et al. |
| 6,550,018 B1 | 4/2003 | Abonamah et al. |
| 6,557,042 B1 | 4/2003 | He et al. |
| 6,594,699 B1 | 7/2003 | Sahai et al. |
| 6,601,026 B2 | 7/2003 | Appelt et al. |
| 6,611,628 B1 | 8/2003 | Sekiguchi et al. |
| 6,618,711 B1 | 9/2003 | Ananth |
| 6,643,620 B1 | 11/2003 | Contolini et al. |
| 6,643,643 B1 | 11/2003 | Lee et al. |
| 6,665,657 B1 | 12/2003 | Dibachi |
| 6,681,032 B2 | 1/2004 | Bortolussi et al. |
| 6,704,725 B1 | 3/2004 | Lee |
| 6,732,149 B1 | 5/2004 | Kephart |
| 6,742,094 B2 | 5/2004 | Igari |
| 6,751,363 B1 | 6/2004 | Natsev et al. |
| 6,751,613 B1 | 6/2004 | Lee et al. |
| 6,754,435 B2 | 6/2004 | Kim |
| 6,763,069 B1 | 7/2004 | Divakaran et al. |
| 6,763,519 B1 | 7/2004 | McColl et al. |
| 6,774,917 B1 | 8/2004 | Foote et al. |
| 6,795,818 B1 | 9/2004 | Lee |
| 6,804,356 B1 | 10/2004 | Krishnamachari |
| 6,813,395 B1 | 11/2004 | Kinjo |
| 6,819,797 B1 | 11/2004 | Smith et al. |
| 6,877,134 B1 | 4/2005 | Fuller et al. |
| 6,901,207 B1 | 5/2005 | Watkins |
| 6,938,025 B1 | 8/2005 | Lulich et al. |
| 6,985,172 B1 | 1/2006 | Rigney et al. |
| 7,013,051 B2 | 3/2006 | Sekiguchi et al. |
| 7,020,654 B1 | 3/2006 | Najmi |
| 7,023,979 B1 | 4/2006 | Wu et al. |
| 7,043,473 B1 | 5/2006 | Rassool et al. |
| 7,158,681 B2 | 1/2007 | Persiantsev |
| 7,215,828 B2 | 5/2007 | Luo |
| 7,260,564 B1 | 8/2007 | Lynn et al. |
| 7,289,643 B2 | 10/2007 | Brunk et al. |
| 7,299,261 B1 | 11/2007 | Oliver et al. |
| 7,302,089 B1 | 11/2007 | Smits |
| 7,302,117 B2 | 11/2007 | Sekiguchi et al. |
| 7,313,805 B1 | 12/2007 | Rosin et al. |
| 7,340,358 B2 | 3/2008 | Yoneyama |
| 7,346,629 B2 | 3/2008 | Kapur et al. |
| 7,353,224 B2 | 4/2008 | Chen et al. |
| 7,376,672 B2 | 5/2008 | Weare |
| 7,383,179 B2 | 6/2008 | Alves et al. |
| 7,433,895 B2 | 10/2008 | Li et al. |
| 7,464,086 B2 | 12/2008 | Black et al. |
| 7,529,659 B2 | 5/2009 | Wold |
| 7,577,656 B2 | 8/2009 | Kawai et al. |
| 7,657,100 B2 | 2/2010 | Gokturk et al. |
| 7,660,468 B2 | 2/2010 | Gokturk et al. |
| 7,805,446 B2 | 9/2010 | Potok et al. |
| 7,860,895 B1 | 12/2010 | Scofield et al. |
| 7,872,669 B2 | 1/2011 | Darrell et al. |
| 7,921,288 B1 | 4/2011 | Hildebrand |
| 7,933,407 B2 | 4/2011 | Keidar et al. |
| 8,023,739 B2 | 9/2011 | Hohimer et al. |
| 8,026,944 B1 | 9/2011 | Sah |
| 8,266,185 B2 | 9/2012 | Raichelgauz et al. |
| 8,285,718 B1 | 10/2012 | Ong et al. |
| 8,312,031 B2 | 11/2012 | Raichelgauz et al. |
| 8,315,442 B2 | 11/2012 | Gokturk et al. |
| 8,345,982 B2 | 1/2013 | Gokturk et al. |
| 8,386,400 B2 | 2/2013 | Raichelgauz et al. |
| 8,396,876 B2 | 3/2013 | Kennedy et al. |
| 8,418,206 B2 | 4/2013 | Bryant et al. |
| 8,442,321 B1 | 5/2013 | Chang et al. |
| 8,457,827 B1 | 6/2013 | Ferguson et al. |
| 8,495,489 B1 | 7/2013 | Everingham |
| 8,635,531 B2 | 1/2014 | Graham et al. |
| 8,655,801 B2 | 2/2014 | Raichelgauz et al. |
| 8,655,878 B1 | 2/2014 | Kulkarni et al. |
| RE44,963 E | 6/2014 | Shannon |
| 8,799,195 B2 | 8/2014 | Raichelgauz et al. |
| 8,799,196 B2 | 8/2014 | Raichelquaz et al. |
| 8,818,916 B2 | 8/2014 | Raichelgauz et al. |
| 8,868,861 B2 | 10/2014 | Shimizu et al. |
| 8,886,648 B1 | 11/2014 | Procopio et al. |
| 8,954,887 B1 | 2/2015 | Tseng et al. |
| 8,990,199 B1 | 3/2015 | Ramesh et al. |
| 9,009,086 B2 | 4/2015 | Raichelgauz et al. |
| 9,104,747 B2 | 8/2015 | Raichelgauz et al. |
| 9,165,406 B1 | 10/2015 | Gray et al. |
| 9,235,557 B2 | 1/2016 | Raichelgauz et al. |
| 9,286,623 B2 | 3/2016 | Raichelgauz et al. |
| 9,311,308 B2 | 4/2016 | Sankarasubramaniam et al. |
| 9,323,754 B2 | 4/2016 | Ramanathan et al. |
| 9,392,324 B1 | 7/2016 | Maltar et al. |
| 9,416,499 B2 | 8/2016 | Cronin et al. |
| 9,466,068 B2 | 10/2016 | Raichelgauz et al. |
| 9,646,006 B2 | 5/2017 | Raichelgauz et al. |
| 9,679,062 B2 | 6/2017 | Schillings et al. |
| 9,807,442 B2 | 10/2017 | Bhatia et al. |
| 9,863,928 B1 | 1/2018 | Peterson et al. |
| 9,875,445 B2 | 1/2018 | Amer et al. |
| 9,953,533 B1 | 4/2018 | Graves |
| 9,953,535 B1 | 4/2018 | Canavor et al. |
| 9,984,369 B2 | 5/2018 | Li et al. |
| 10,048,700 B1 | 8/2018 | Curlander et al. |
| 10,106,009 B2 * | 10/2018 | Hirao .................... B60G 17/08 |
| 10,157,291 B1 | 12/2018 | Kenthapadi et al. |
| 10,235,882 B1 | 3/2019 | Aoude et al. |
| 10,253,468 B1 | 4/2019 | Linville et al. |
| 10,395,332 B1 | 8/2019 | Konrardy et al. |
| 10,414,398 B2 | 9/2019 | Ochi |
| 10,416,670 B1 | 9/2019 | Fields et al. |
| 10,417,914 B1 | 9/2019 | Vose et al. |
| 10,467,893 B1 | 11/2019 | Soryal et al. |
| 10,545,023 B1 | 1/2020 | Herbach et al. |
| 10,684,626 B1 | 6/2020 | Martin |

(56) References Cited

U.S. PATENT DOCUMENTS

| | | |
|---|---|---|
| 10,916,124 B2 | 2/2021 | Geisler |
| 10,922,788 B1 | 2/2021 | Yu et al. |
| 10,967,877 B2 | 4/2021 | Asakura et al. |
| 2001/0019633 A1 | 9/2001 | Tenze et al. |
| 2001/0034219 A1 | 10/2001 | Hewitt et al. |
| 2001/0038876 A1 | 11/2001 | Anderson |
| 2002/0004743 A1 | 1/2002 | Kutaragi et al. |
| 2002/0010682 A1 | 1/2002 | Johnson |
| 2002/0010715 A1 | 1/2002 | Chinn et al. |
| 2002/0019881 A1 | 2/2002 | Bokhari et al. |
| 2002/0032677 A1 | 3/2002 | Morgenthaler et al. |
| 2002/0038299 A1 | 3/2002 | Zernik et al. |
| 2002/0042914 A1 | 4/2002 | Walker et al. |
| 2002/0072935 A1 | 6/2002 | Rowse et al. |
| 2002/0087530 A1 | 7/2002 | Smith et al. |
| 2002/0087828 A1 | 7/2002 | Arimilli et al. |
| 2002/0091947 A1 | 7/2002 | Nakamura |
| 2002/0107827 A1 | 8/2002 | Benitez-Jimenez et al. |
| 2002/0113812 A1 | 8/2002 | Walker et al. |
| 2002/0126002 A1 | 9/2002 | Patchell |
| 2002/0126872 A1 | 9/2002 | Brunk et al. |
| 2002/0129140 A1 | 9/2002 | Peled et al. |
| 2002/0147637 A1 | 10/2002 | Kraft et al. |
| 2002/0157116 A1 | 10/2002 | Jasinschi |
| 2002/0163532 A1 | 11/2002 | Thomas et al. |
| 2002/0174095 A1 | 11/2002 | Lulich et al. |
| 2002/0181336 A1 | 12/2002 | Shields |
| 2002/0184505 A1 | 12/2002 | Mihcak et al. |
| 2003/0004966 A1 | 1/2003 | Bolle et al. |
| 2003/0005432 A1 | 1/2003 | Ellis et al. |
| 2003/0037010 A1 | 2/2003 | Schmelzer |
| 2003/0041047 A1 | 2/2003 | Chang et al. |
| 2003/0089216 A1 | 5/2003 | Birmingham et al. |
| 2003/0093790 A1 | 5/2003 | Logan et al. |
| 2003/0101150 A1 | 5/2003 | Agnihotri et al. |
| 2003/0105739 A1 | 6/2003 | Essafi et al. |
| 2003/0110236 A1 | 6/2003 | Yang et al. |
| 2003/0115191 A1 | 6/2003 | Copperman et al. |
| 2003/0126147 A1 | 7/2003 | Essafi et al. |
| 2003/0140257 A1 | 7/2003 | Peterka et al. |
| 2003/0145002 A1 | 7/2003 | Kleinberger et al. |
| 2003/0158839 A1 | 8/2003 | Faybishenko et al. |
| 2003/0165269 A1 | 9/2003 | Fedorovskaya et al. |
| 2003/0174859 A1 | 9/2003 | Kim |
| 2003/0184598 A1 | 10/2003 | Graham |
| 2003/0200217 A1 | 10/2003 | Ackerman |
| 2003/0217335 A1 | 11/2003 | Chung et al. |
| 2003/0229531 A1 | 12/2003 | Heckerman et al. |
| 2004/0095376 A1 | 5/2004 | Graham et al. |
| 2004/0098671 A1 | 5/2004 | Graham et al. |
| 2004/0111432 A1 | 6/2004 | Adams et al. |
| 2004/0117638 A1 | 6/2004 | Monroe |
| 2004/0128511 A1 | 7/2004 | Sun et al. |
| 2004/0153426 A1 | 8/2004 | Nugent |
| 2004/0162820 A1 | 8/2004 | James et al. |
| 2004/0257233 A1 | 12/2004 | Proebsting |
| 2004/0267774 A1 | 12/2004 | Lin et al. |
| 2005/0021394 A1 | 1/2005 | Miedema et al. |
| 2005/0080788 A1 | 4/2005 | Murata |
| 2005/0114198 A1 | 5/2005 | Koningstein et al. |
| 2005/0131884 A1 | 6/2005 | Gross et al. |
| 2005/0149369 A1 | 7/2005 | Sevdermish |
| 2005/0163375 A1 | 7/2005 | Grady |
| 2005/0172130 A1 | 8/2005 | Roberts |
| 2005/0177372 A1 | 8/2005 | Wang et al. |
| 2005/0193093 A1 | 9/2005 | Mathew et al. |
| 2005/0226511 A1 | 10/2005 | Short |
| 2005/0238198 A1 | 10/2005 | Brown et al. |
| 2005/0238238 A1 | 10/2005 | Xu et al. |
| 2005/0249398 A1 | 11/2005 | Khamene et al. |
| 2005/0256820 A1 | 11/2005 | Dugan et al. |
| 2005/0262428 A1 | 11/2005 | Little et al. |
| 2005/0281439 A1 | 12/2005 | Lange |
| 2005/0289163 A1 | 12/2005 | Gordon et al. |
| 2005/0289590 A1 | 12/2005 | Cheok et al. |
| 2006/0004745 A1 | 1/2006 | Kuhn et al. |
| 2006/0015580 A1 | 1/2006 | Gabriel et al. |
| 2006/0020958 A1 | 1/2006 | Allamanche et al. |
| 2006/0033163 A1 | 2/2006 | Chen |
| 2006/0050993 A1 | 3/2006 | Stentiford |
| 2006/0069668 A1 | 3/2006 | Braddy et al. |
| 2006/0074588 A1 | 4/2006 | Blodgett et al. |
| 2006/0080311 A1 | 4/2006 | Potok et al. |
| 2006/0093190 A1 | 5/2006 | Cheng et al. |
| 2006/0112035 A1 | 5/2006 | Cecchi et al. |
| 2006/0129822 A1 | 6/2006 | Snijder et al. |
| 2006/0217818 A1 | 9/2006 | Fujiwara |
| 2006/0217828 A1 | 9/2006 | Hicken |
| 2006/0218191 A1 | 9/2006 | Gopalakrishnan |
| 2006/0224529 A1 | 10/2006 | Kermani |
| 2006/0236343 A1 | 10/2006 | Chang |
| 2006/0242130 A1 | 10/2006 | Sadri et al. |
| 2006/0248558 A1 | 11/2006 | Barton et al. |
| 2006/0251338 A1 | 11/2006 | Gokturk et al. |
| 2006/0253423 A1 | 11/2006 | McLane et al. |
| 2006/0267975 A1 | 11/2006 | Moses et al. |
| 2006/0288002 A1 | 12/2006 | Epstein et al. |
| 2007/0022374 A1 | 1/2007 | Huang et al. |
| 2007/0033170 A1 | 2/2007 | Sull et al. |
| 2007/0038614 A1 | 2/2007 | Guha |
| 2007/0042757 A1 | 2/2007 | Jung et al. |
| 2007/0061302 A1 | 3/2007 | Ramer et al. |
| 2007/0067304 A1 | 3/2007 | Ives |
| 2007/0074147 A1 | 3/2007 | Wold |
| 2007/0081088 A1 | 4/2007 | Gotoh et al. |
| 2007/0083611 A1 | 4/2007 | Farago et al. |
| 2007/0091106 A1 | 4/2007 | Moroney |
| 2007/0130159 A1 | 6/2007 | Gulli et al. |
| 2007/0136782 A1 | 6/2007 | Ramaswamy et al. |
| 2007/0156720 A1 | 7/2007 | Maren |
| 2007/0244902 A1 | 10/2007 | Seide et al. |
| 2007/0253594 A1 | 11/2007 | Lu et al. |
| 2007/0282513 A1 | 12/2007 | Michi et al. |
| 2007/0294187 A1 | 12/2007 | Scherrer |
| 2007/0298152 A1 | 12/2007 | Baets |
| 2008/0006615 A1 | 1/2008 | Rosario et al. |
| 2008/0049789 A1 | 2/2008 | Vedantham et al. |
| 2008/0071465 A1 | 3/2008 | Chapman et al. |
| 2008/0072256 A1 | 3/2008 | Boicey et al. |
| 2008/0079729 A1 | 4/2008 | Brailovsky |
| 2008/0152231 A1 | 6/2008 | Gokturk et al. |
| 2008/0159622 A1 | 7/2008 | Agnihotri et al. |
| 2008/0161986 A1 | 7/2008 | Breed |
| 2008/0165018 A1 | 7/2008 | Breed |
| 2008/0165861 A1 | 7/2008 | Wen et al. |
| 2008/0201299 A1 | 8/2008 | Lehikoinen et al. |
| 2008/0201314 A1 | 8/2008 | Smith et al. |
| 2008/0201361 A1 | 8/2008 | Castro et al. |
| 2008/0228749 A1 | 9/2008 | Brown |
| 2008/0228995 A1 | 9/2008 | Tan et al. |
| 2008/0237359 A1 | 10/2008 | Silverbrook et al. |
| 2008/0247543 A1 | 10/2008 | Mick et al. |
| 2008/0253737 A1 | 10/2008 | Kimura et al. |
| 2008/0263579 A1 | 10/2008 | Mears et al. |
| 2008/0270373 A1 | 10/2008 | Oostveen et al. |
| 2008/0294278 A1 | 11/2008 | Borgeson et al. |
| 2008/0307454 A1 | 12/2008 | Ahanger et al. |
| 2008/0313140 A1 | 12/2008 | Pereira et al. |
| 2009/0024641 A1 | 1/2009 | Quigley et al. |
| 2009/0037088 A1 | 2/2009 | Taguchi |
| 2009/0043637 A1 | 2/2009 | Eder |
| 2009/0096634 A1 | 4/2009 | Emam et al. |
| 2009/0125544 A1 | 5/2009 | Brindley |
| 2009/0157575 A1 | 6/2009 | Schobben et al. |
| 2009/0165031 A1 | 6/2009 | Li et al. |
| 2009/0172030 A1 | 7/2009 | Schiff et al. |
| 2009/0208106 A1 | 8/2009 | Dunlop et al. |
| 2009/0208118 A1 | 8/2009 | Csurka |
| 2009/0216761 A1 | 8/2009 | Raichelgauz et al. |
| 2009/0220138 A1 | 9/2009 | Zhang et al. |
| 2009/0232361 A1 | 9/2009 | Miller |
| 2009/0234878 A1 | 9/2009 | Herz et al. |
| 2009/0245573 A1 | 10/2009 | Saptharishi et al. |
| 2009/0254572 A1 | 10/2009 | Redlich et al. |

(56) References Cited

U.S. PATENT DOCUMENTS

| | | |
|---|---|---|
| 2009/0282218 A1 | 11/2009 | Raichelgauz et al. |
| 2009/0297048 A1 | 12/2009 | Slotine et al. |
| 2010/0010751 A1 | 1/2010 | Blodgett et al. |
| 2010/0010752 A1 | 1/2010 | Blodgett et al. |
| 2010/0030474 A1 | 2/2010 | Sawada |
| 2010/0035648 A1 | 2/2010 | Huang |
| 2010/0042646 A1 | 2/2010 | Raichelgauz et al. |
| 2010/0049374 A1 | 2/2010 | Ferrin et al. |
| 2010/0082684 A1 | 4/2010 | Churchill et al. |
| 2010/0104184 A1 | 4/2010 | Bronstein et al. |
| 2010/0125569 A1 | 5/2010 | Nair et al. |
| 2010/0161652 A1 | 6/2010 | Bellare et al. |
| 2010/0162405 A1 | 6/2010 | Cook et al. |
| 2010/0191391 A1 | 7/2010 | Zeng |
| 2010/0198626 A1 | 8/2010 | Cho et al. |
| 2010/0212015 A1 | 8/2010 | Jin et al. |
| 2010/0262609 A1 | 10/2010 | Raichelgauz et al. |
| 2010/0284604 A1 | 11/2010 | Chrysanthakopoulos |
| 2010/0293057 A1 | 11/2010 | Haveliwala et al. |
| 2010/0312736 A1 | 12/2010 | Kello |
| 2010/0318493 A1 | 12/2010 | Wessling |
| 2010/0325138 A1 | 12/2010 | Lee et al. |
| 2010/0325581 A1 | 12/2010 | Finkelstein et al. |
| 2011/0035373 A1 | 2/2011 | Berg et al. |
| 2011/0055585 A1 | 3/2011 | Lee |
| 2011/0060496 A1 | 3/2011 | Nielsen et al. |
| 2011/0077028 A1 | 3/2011 | Wilkes, III et al. |
| 2011/0164180 A1 | 7/2011 | Lee |
| 2011/0164810 A1 | 7/2011 | Zang et al. |
| 2011/0190972 A1 | 8/2011 | Timmons et al. |
| 2011/0216209 A1 | 9/2011 | Fredlund et al. |
| 2011/0218946 A1 | 9/2011 | Stern et al. |
| 2011/0276680 A1 | 11/2011 | Rimon |
| 2011/0296315 A1 | 12/2011 | Lin et al. |
| 2011/0307542 A1 | 12/2011 | Wang et al. |
| 2012/0041969 A1 | 2/2012 | Priyadarshan et al. |
| 2012/0131454 A1 | 5/2012 | Shah |
| 2012/0136853 A1 | 5/2012 | Kennedy et al. |
| 2012/0155726 A1 | 6/2012 | Li et al. |
| 2012/0167133 A1 | 6/2012 | Carroll et al. |
| 2012/0179642 A1 | 7/2012 | Sweeney et al. |
| 2012/0185445 A1 | 7/2012 | Borden et al. |
| 2012/0207346 A1 | 8/2012 | Kohli et al. |
| 2012/0219191 A1 | 8/2012 | Benzarti et al. |
| 2012/0221470 A1 | 8/2012 | Lyon |
| 2012/0227074 A1 | 9/2012 | Hill et al. |
| 2012/0239690 A1 | 9/2012 | Asikainen et al. |
| 2012/0239694 A1 | 9/2012 | Avner et al. |
| 2012/0265735 A1 | 10/2012 | McMillan et al. |
| 2012/0294514 A1 | 11/2012 | Saunders et al. |
| 2012/0299961 A1 | 11/2012 | Ramkumar et al. |
| 2012/0301105 A1 | 11/2012 | Rehg et al. |
| 2012/0331011 A1 | 12/2012 | Raichelgauz et al. |
| 2013/0043990 A1 | 2/2013 | Al-Jafar |
| 2013/0066856 A1 | 3/2013 | Ong et al. |
| 2013/0067364 A1 | 3/2013 | Berntson et al. |
| 2013/0086499 A1 | 4/2013 | Dyor et al. |
| 2013/0089248 A1 | 4/2013 | Remiszewski et al. |
| 2013/0151522 A1 | 6/2013 | Aggarwal et al. |
| 2013/0159298 A1 | 6/2013 | Mason et al. |
| 2013/0211705 A1 | 8/2013 | Geelen et al. |
| 2013/0226930 A1 | 8/2013 | Arngren et al. |
| 2013/0227023 A1 | 8/2013 | Raichelgauz et al. |
| 2013/0283401 A1 | 10/2013 | Pabla et al. |
| 2013/0346412 A1 | 12/2013 | Raichelgauz et al. |
| 2014/0019264 A1 | 1/2014 | Wachman et al. |
| 2014/0025692 A1 | 1/2014 | Pappas |
| 2014/0037138 A1 | 2/2014 | Sato et al. |
| 2014/0125703 A1 | 5/2014 | Roveta et al. |
| 2014/0139670 A1 | 5/2014 | Kesavan et al. |
| 2014/0147829 A1 | 5/2014 | Jerauld |
| 2014/0149918 A1 | 5/2014 | Asokan et al. |
| 2014/0152698 A1 | 6/2014 | Kim et al. |
| 2014/0156691 A1 | 6/2014 | Conwell |
| 2014/0169681 A1 | 6/2014 | Drake |
| 2014/0176604 A1 | 6/2014 | Venkitaraman et al. |
| 2014/0193077 A1 | 7/2014 | Shiiyama et al. |
| 2014/0195093 A1 | 7/2014 | Litkouhi et al. |
| 2014/0198986 A1 | 7/2014 | Marchesotti |
| 2014/0201126 A1 | 7/2014 | Zadeh et al. |
| 2014/0201330 A1 | 7/2014 | Lopez et al. |
| 2014/0236414 A1 | 8/2014 | Droz et al. |
| 2014/0247342 A1 | 9/2014 | Ellenby et al. |
| 2014/0250032 A1 | 9/2014 | Huang et al. |
| 2014/0282655 A1 | 9/2014 | Roberts |
| 2014/0288453 A1 | 9/2014 | Liu et al. |
| 2014/0300722 A1 | 10/2014 | Garcia |
| 2014/0328512 A1 | 11/2014 | Gurwicz et al. |
| 2014/0330830 A1 | 11/2014 | Raichelgauz et al. |
| 2014/0341476 A1 | 11/2014 | Kulick et al. |
| 2014/0363044 A1 | 12/2014 | Williams et al. |
| 2015/0052089 A1 | 2/2015 | Kozloski et al. |
| 2015/0057869 A1 | 2/2015 | Healey et al. |
| 2015/0071457 A1 | 3/2015 | Burciu |
| 2015/0100562 A1 | 4/2015 | Kohlmeier et al. |
| 2015/0117784 A1 | 4/2015 | Lin et al. |
| 2015/0120627 A1 | 4/2015 | Hunzinger et al. |
| 2015/0120760 A1 | 4/2015 | Wang et al. |
| 2015/0123968 A1 | 5/2015 | Holverda et al. |
| 2015/0127516 A1 | 5/2015 | Studnitzer et al. |
| 2015/0130643 A1 | 5/2015 | Nagy |
| 2015/0153735 A1 | 6/2015 | Clarke et al. |
| 2015/0166069 A1 | 6/2015 | Engelman et al. |
| 2015/0190284 A1 | 7/2015 | Censo et al. |
| 2015/0203116 A1 | 7/2015 | Fairgrieve et al. |
| 2015/0213325 A1 | 7/2015 | Krishnamoorthi et al. |
| 2015/0224988 A1 | 8/2015 | Buerkle et al. |
| 2015/0248586 A1 | 9/2015 | Gaidon et al. |
| 2015/0254344 A1 | 9/2015 | Kulkarni et al. |
| 2015/0266455 A1 | 9/2015 | Wilson |
| 2015/0286742 A1 | 10/2015 | Zhang et al. |
| 2015/0286872 A1 | 10/2015 | Medioni et al. |
| 2015/0293976 A1 | 10/2015 | Guo et al. |
| 2015/0324356 A1 | 11/2015 | Gutierrez et al. |
| 2015/0332588 A1 | 11/2015 | Bulan et al. |
| 2016/0007083 A1 | 1/2016 | Gurha |
| 2016/0026707 A1 | 1/2016 | Ong et al. |
| 2016/0046298 A1 | 2/2016 | Deruyck et al. |
| 2016/0078339 A1 | 3/2016 | Li et al. |
| 2016/0127641 A1 | 5/2016 | Gove |
| 2016/0132194 A1 | 5/2016 | Grue et al. |
| 2016/0133130 A1 | 5/2016 | Grimm et al. |
| 2016/0142625 A1 | 5/2016 | Weksler et al. |
| 2016/0193996 A1 | 7/2016 | Stefan |
| 2016/0221592 A1 | 8/2016 | Puttagunta et al. |
| 2016/0275766 A1 | 9/2016 | Venetianer et al. |
| 2016/0284095 A1 | 9/2016 | Chalom et al. |
| 2016/0302046 A1 | 10/2016 | Velusamy |
| 2016/0306798 A1 | 10/2016 | Guo et al. |
| 2016/0330394 A1 | 11/2016 | Shahraray et al. |
| 2016/0355181 A1 | 12/2016 | Teraoka et al. |
| 2016/0379091 A1 | 12/2016 | Lin et al. |
| 2017/0007521 A1 | 1/2017 | Monsonís et al. |
| 2017/0008521 A1 | 1/2017 | Braunstein et al. |
| 2017/0017638 A1 | 1/2017 | Satyavarta et al. |
| 2017/0018178 A1 | 1/2017 | Poechmueller et al. |
| 2017/0072851 A1 | 3/2017 | Shenoy et al. |
| 2017/0075036 A1 | 3/2017 | Pikhletsky et al. |
| 2017/0078621 A1 | 3/2017 | Sahay et al. |
| 2017/0090473 A1 | 3/2017 | Cooper et al. |
| 2017/0092122 A1 | 3/2017 | Sharan |
| 2017/0111576 A1 | 4/2017 | Tojo et al. |
| 2017/0129298 A1* | 5/2017 | Lu .................. B60G 17/015 |
| 2017/0136842 A1 | 5/2017 | Anderson et al. |
| 2017/0154241 A1 | 6/2017 | Shambik et al. |
| 2017/0180623 A1 | 6/2017 | Lin |
| 2017/0221365 A1* | 8/2017 | Banvait ............... G05D 1/0246 |
| 2017/0243370 A1 | 8/2017 | Hoye et al. |
| 2017/0263128 A1 | 9/2017 | Chandran et al. |
| 2017/0293296 A1 | 10/2017 | Stenneth et al. |
| 2017/0297401 A1 | 10/2017 | Hrovat et al. |
| 2017/0326937 A1* | 11/2017 | Miska ................ B60G 17/0165 |
| 2017/0344023 A1 | 11/2017 | Laubinger et al. |
| 2017/0351268 A1 | 12/2017 | Anderson et al. |

(56) References Cited

U.S. PATENT DOCUMENTS

| | | | |
|---|---|---|---|
| 2018/0015801 A1* | 1/2018 | Mohamed | H04L 67/12 |
| 2018/0022361 A1 | 1/2018 | Rao et al. | |
| 2018/0025235 A1 | 1/2018 | Fridman | |
| 2018/0046869 A1 | 2/2018 | Cordell et al. | |
| 2018/0060690 A1 | 3/2018 | Lee et al. | |
| 2018/0061253 A1 | 3/2018 | Hyun | |
| 2018/0079272 A1* | 3/2018 | Aikin | B60G 17/0195 |
| 2018/0082591 A1 | 3/2018 | Pandy | |
| 2018/0101177 A1 | 4/2018 | Cohen | |
| 2018/0108258 A1 | 4/2018 | Dilger | |
| 2018/0113461 A1 | 4/2018 | Potnis et al. | |
| 2018/0144640 A1 | 5/2018 | Price et al. | |
| 2018/0151073 A1 | 5/2018 | Minemura et al. | |
| 2018/0157666 A1 | 6/2018 | Raichelgauz et al. | |
| 2018/0157903 A1 | 6/2018 | Tu et al. | |
| 2018/0170392 A1 | 6/2018 | Yang et al. | |
| 2018/0174001 A1 | 6/2018 | Kang | |
| 2018/0188731 A1 | 7/2018 | Matthiesen et al. | |
| 2018/0188746 A1 | 7/2018 | Lesher et al. | |
| 2018/0189613 A1 | 7/2018 | Wolf et al. | |
| 2018/0204335 A1 | 7/2018 | Agata et al. | |
| 2018/0210462 A1 | 7/2018 | Switkes et al. | |
| 2018/0218608 A1 | 8/2018 | Offenhaeuser et al. | |
| 2018/0257698 A1* | 9/2018 | Ryne | G05B 13/0265 |
| 2018/0268292 A1 | 9/2018 | Choi et al. | |
| 2018/0338229 A1 | 11/2018 | Nemec et al. | |
| 2018/0354505 A1 | 12/2018 | Meier et al. | |
| 2018/0356817 A1 | 12/2018 | Poeppel | |
| 2018/0373929 A1 | 12/2018 | Ye | |
| 2019/0034764 A1 | 1/2019 | Oh et al. | |
| 2019/0064929 A1 | 2/2019 | Tomeh et al. | |
| 2019/0071093 A1 | 3/2019 | Ma et al. | |
| 2019/0072965 A1 | 3/2019 | Zhang et al. | |
| 2019/0072966 A1 | 3/2019 | Zhang et al. | |
| 2019/0073908 A1 | 3/2019 | Neubecker et al. | |
| 2019/0088135 A1 | 3/2019 | Do et al. | |
| 2019/0096135 A1 | 3/2019 | Mutto et al. | |
| 2019/0100068 A1* | 4/2019 | Tong | B60G 17/01908 |
| 2019/0139419 A1 | 5/2019 | Wendt et al. | |
| 2019/0147259 A1 | 5/2019 | Molin et al. | |
| 2019/0163204 A1 | 5/2019 | Bai et al. | |
| 2019/0171912 A1 | 6/2019 | Vallespi-Gonzalez et al. | |
| 2019/0193751 A1 | 6/2019 | Fernando et al. | |
| 2019/0196471 A1 | 6/2019 | Vaughn et al. | |
| 2019/0205798 A1 | 7/2019 | Rosas-Maxemin et al. | |
| 2019/0213324 A1 | 7/2019 | Thorn | |
| 2019/0220011 A1 | 7/2019 | Penna | |
| 2019/0225214 A1 | 7/2019 | Pohl et al. | |
| 2019/0246042 A1 | 8/2019 | Liu | |
| 2019/0253614 A1 | 8/2019 | Oleson et al. | |
| 2019/0279046 A1 | 9/2019 | Han et al. | |
| 2019/0279293 A1 | 9/2019 | Tang et al. | |
| 2019/0287515 A1 | 9/2019 | Li et al. | |
| 2019/0291720 A1 | 9/2019 | Xiao et al. | |
| 2019/0304102 A1 | 10/2019 | Chen et al. | |
| 2019/0311226 A1 | 10/2019 | Xiao et al. | |
| 2019/0315346 A1 | 10/2019 | Yoo et al. | |
| 2019/0337521 A1 | 11/2019 | Stauber | |
| 2019/0340924 A1 | 11/2019 | Abari et al. | |
| 2019/0347492 A1 | 11/2019 | Morimura et al. | |
| 2019/0355132 A1 | 11/2019 | Kushleyev et al. | |
| 2019/0378006 A1 | 12/2019 | Fukuda et al. | |
| 2019/0384303 A1 | 12/2019 | Muller et al. | |
| 2019/0392831 A1 | 12/2019 | Pohl | |
| 2020/0012871 A1 | 1/2020 | Lee et al. | |
| 2020/0027002 A1 | 1/2020 | Hickson et al. | |
| 2020/0027351 A1 | 1/2020 | Gotoda et al. | |
| 2020/0027355 A1 | 1/2020 | Sujan et al. | |
| 2020/0053262 A1 | 2/2020 | Wexler et al. | |
| 2020/0074326 A1 | 3/2020 | Balakrishnan et al. | |
| 2020/0086881 A1 | 3/2020 | Abendroth et al. | |
| 2020/0090426 A1 | 3/2020 | Barnes et al. | |
| 2020/0110982 A1 | 4/2020 | Gou et al. | |
| 2020/0117902 A1 | 4/2020 | Wexler et al. | |
| 2020/0120267 A1 | 4/2020 | Netto et al. | |
| 2020/0125927 A1 | 4/2020 | Kim | |
| 2020/0156784 A1 | 5/2020 | Carnell | |
| 2020/0175384 A1 | 6/2020 | Zhang et al. | |
| 2020/0175550 A1 | 6/2020 | Raichelgauz et al. | |
| 2020/0269864 A1 | 8/2020 | Zhang et al. | |
| 2020/0272940 A1 | 8/2020 | Sun et al. | |
| 2020/0293035 A1 | 9/2020 | Sakurada et al. | |
| 2020/0302295 A1 | 9/2020 | Tung et al. | |
| 2020/0304707 A1 | 9/2020 | Williams et al. | |
| 2020/0324778 A1 | 10/2020 | Diamond et al. | |
| 2020/0370890 A1 | 11/2020 | Hamilton et al. | |
| 2020/0371518 A1 | 11/2020 | Kang | |
| 2020/0410322 A1 | 12/2020 | Naphade et al. | |
| 2021/0009270 A1 | 1/2021 | Chen et al. | |
| 2021/0041248 A1 | 2/2021 | Li et al. | |
| 2021/0049908 A1 | 2/2021 | Pipe et al. | |
| 2021/0055741 A1 | 2/2021 | Kawanai et al. | |
| 2021/0056492 A1 | 2/2021 | Zass | |
| 2021/0056852 A1 | 2/2021 | Lund et al. | |
| 2021/0096565 A1 | 4/2021 | Xie et al. | |
| 2021/0097309 A1 | 4/2021 | Kaku et al. | |
| 2021/0148831 A1 | 5/2021 | Raichelgauz et al. | |
| 2021/0164177 A1 | 6/2021 | Wientjes | |
| 2021/0182539 A1 | 6/2021 | Rassool | |
| 2021/0192357 A1 | 6/2021 | Sinha et al. | |
| 2021/0209332 A1 | 7/2021 | Nishio et al. | |
| 2021/0224917 A1 | 7/2021 | Gaudin et al. | |
| 2021/0248904 A1 | 8/2021 | Nguyen | |
| 2021/0266437 A1 | 8/2021 | Wexler et al. | |
| 2021/0272207 A1 | 9/2021 | Fields et al. | |
| 2021/0284183 A1 | 9/2021 | Marenco et al. | |
| 2021/0284191 A1 | 9/2021 | Raichelgauz et al. | |
| 2021/0316747 A1 | 10/2021 | Klein | |
| 2021/0390351 A1 | 12/2021 | Romain, II | |
| 2021/0390840 A1 | 12/2021 | Rejal et al. | |
| 2021/0409593 A1 | 12/2021 | Zacharias et al. | |
| 2022/0005291 A1 | 1/2022 | Konrardy et al. | |
| 2022/0038620 A1 | 2/2022 | Demers | |
| 2022/0058393 A1 | 2/2022 | Calvert et al. | |
| 2022/0126864 A1 | 4/2022 | Moustafa et al. | |
| 2022/0161815 A1 | 5/2022 | Beek et al. | |
| 2022/0187847 A1 | 6/2022 | Cella et al. | |
| 2022/0191389 A1 | 6/2022 | Lei | |
| 2022/0234501 A1 | 7/2022 | Odinaev et al. | |
| 2022/0286603 A1 | 9/2022 | Lv et al. | |
| 2022/0327886 A1 | 10/2022 | Mathur et al. | |
| 2022/0345621 A1 | 10/2022 | Shi et al. | |

FOREIGN PATENT DOCUMENTS

| | | | |
|---|---|---|---|
| CN | 107472252 B | 4/2022 | |
| CN | 111866468 B | 6/2022 | |
| DE | 102012009297 A1 | 12/2012 | |
| DE | 102017115059 A1 * | 1/2018 | B60G 17/0165 |
| DE | 102016122686 A1 | 5/2018 | |
| EP | 1085464 A3 | 1/2007 | |
| EP | 3910540 A1 | 11/2021 | |
| IL | 163201 A | 8/2013 | |
| JP | 2018511807 A | 4/2018 | |
| WO | 0231764 A2 | 4/2002 | |
| WO | 2003067467 A1 | 8/2003 | |
| WO | 2005027457 A1 | 3/2005 | |
| WO | 2007049282 A2 | 5/2007 | |
| WO | 2014076002 A1 | 5/2014 | |
| WO | 2014137337 A1 | 9/2014 | |
| WO | 2014141282 A1 | 9/2014 | |
| WO | 2016040376 A1 | 3/2016 | |
| WO | 2016070193 A1 | 5/2016 | |
| WO | 2018035145 A1 | 2/2018 | |
| WO | WO-2018056130 A1 * | 3/2018 | |
| WO | 2018132088 A1 | 7/2018 | |
| WO | WO-2018193685 A1 * | 10/2018 | B60G 17/0165 |

OTHER PUBLICATIONS

Vallet et al ("Personalized Content Retrieval in Context Using Ontological Knowledge" Mar. 2007) (Year: 2007).

(56) References Cited

OTHER PUBLICATIONS

Vallet, David, et al. "Personalized content retrieval in context using ontological knowledge." IEEE Transactions on circuits andsystems for video technology 17.3 (2007): 336-346. (Year: 2007).
Verstraeten et al, "Isolated word recognition with the Liquid State Machine: a case study", Department of Electronics and Information Systems, Ghent University, Sint-Pietersnieuwstraat 41, 9000 Gent, Belgium, Available onlline Jul. 14, 2005, pp. 521-528.
Wang et al., "Classifying Objectionable Websites Based onImage Content", Stanford University, pp. 1-12.
Ware et al, "Locating and Identifying Components in a Robot's Workspace using a Hybrid Computer Architecture" Proceedings of the 1995 IEEE International Symposium on Intelligent Control, Aug. 27-29, 1995, pp. 139-144.
Whitby-Strevens, "The transputer", 1985 IEEE, pp. 292-300.
Wilk et al., "The Potential of Social-Aware Multimedia Prefetching on Mobile Devices", International Conference and Workshops on networked Systems (NetSys), 2015, pp. 1-5.
Yanagawa et al, "Columbia University's Baseline Detectors for 374 LSCOM Semantic Visual Concepts", Columbia University ADVENT Technical Report # 222-2006-8, Mar. 20, 2007, pp. 1-17.
Yanagawa et al., "Columbia University's Baseline Detectors for 374 LSCOM Semantic Visual Concepts", Columbia University ADVENT Technical Report #222, 2007, pp. 2006-2008.
Yanai, Generic Image Classification Using Visual Knowledge on the Web, pp. 167-174 (Year: 2003).
Zhou et al, "Ensembling neural networks: Many could be better than all", National Laboratory for Novel Software Technology, Nanjing University, Hankou Road 22, Nanjing 210093, PR China Received Nov. 16, 2001, Available online Mar. 12, 2002, pp. 239-263.
Zhou et al, "Medical Diagnosis With C4.5 Rule Preceded by Artificial Neural Network Ensemble", IEEE Transactions on Information Technology in Biomedicine, vol. 7, Issue: 1, Mar. 2003, pp. 37-42.
Zhu et al., "Technology-Assisted Dietary Assesment", Proc SPIE. Mar. 20, 2008, pp. 1-15.
Zou et al., "A Content-Based Image Authentication System with Lossless Data Hiding", ICME 2003, pp. 213-216.
"Computer Vision Demonstration Website", Electronics and Computer Science, University of Southampton, 2005, USA.
Big Bang Theory Series 04 Episode 12, aired Jan. 6, 2011; [retrieved from Internet: ].
Boari et al, "Adaptive Routing for Dynamic Applications in Massively Parallel Architectures", 1995 IEEE, Spring 1995, pp. 1-14.
Burgsteiner et al., "Movement Prediction from Real-World Images Using a Liquid State machine", Innovations in Applied Artificial Intelligence Lecture Notes in Computer Science, Lecture Notes in Artificial Intelligence, LNCS, Springer-Verlag, BE, vol. 3533, Jun. 2005, pp. 121-130.
C. Huang et al., "ACT: An Autonomous Drone Cinematography System for Action Scenes," 2018 IEEE International Conference onRobotics and Automation (ICRA), 2018, pp. 7039-7046, doi: 10.1109/ICRA.2018.8460703. (Year: 2018).
Cernansky et al, "Feed-forward Echo State Networks", Proceedings of International Joint Conference on Neural Networks, Montreal, Canada, Jul. 31-Aug. 4, 2005, pp. 1-4.
Chinchor, Nancy A. et al.; Multimedia Analysis + Visual Analytics = Multimedia Analytics; IEEE Computer Society; 2010; pp. 52-60. (Year: 2010).
Fathy et al, "A Parallel Design and Implementation For Backpropagation Neural Network Using MIMD Architecture", 8th Mediterranean Electrotechnical Conference, 19'96. MELECON '96, Date of Conference: May 13-16, 1996, vol. 3 pp. 1472-1475, vol. 3.
Freisleben et al, "Recognition of Fractal Images Using a Neural Network", Lecture Notes in Computer Science, 1993, vol. 6861, 1993, pp. 631-637.
Galvane, Quentin, et al. "Automated cinematography with unmanned aerial vehicles." arXiv preprint arXiv:1712.04353 (2017). (Year: 2017).
Garcia, "Solving the Weighted Region Least Cost Path Problem Using Transputers", Naval Postgraduate School, Monterey, California, Dec. 1989.
Guo et al, AdOn: An Intelligent Overlay Video Advertising System (Year: 2009).
Hogue, "Tree Pattern Inference and Matching for Wrapper Induction on the World Wide Web", Master's Thesis, Massachusetts Institute of Technology, Jun. 2004, pp. 1-106.
Howlett et al, "A Multi-Computer Neural Network Architecture in a Virtual Sensor System Application", International journal of knowledge-based intelligent engineering systems, 4 (2). pp. 86-93, I33N 1327-2314.
Hu, Weiming, et al. "A survey on visual content-based video indexing and retrieval." IEEE Transactions on Systems, Man, andCybernetics, Part C (Applications and Reviews) 41.6 (2011 ): 797-819. (Year: 2011).
Hua et al., "Robust Video Signature Based on Ordinal Measure", Image Processing, 2004, 2004 International Conference on Image Processing (ICIP), vol. 1, IEEE, pp. 685-688, 2004.
Huang, Chong, et al. "One-shot imitation filming of human motion videos." arXiv preprint arXiv:1912.10609 (2019). (Year: 2019).
International Search Report and Written Opinion for PCT/US2016/050471, ISA/RU, Moscow, RU, Date of Mailing: May 4, 2017.
International Search Report and Written Opinion for PCT/US2016/054634, ISA/RU, Moscow, RU, Date of Mailing: Mar. 16, 2017.
International Search Report and Written Opinion for PCT/US2017/015831, ISA/RU, Moscow, RU, Date of Mailing: Apr. 20, 2017.
J. Chen and P. Carr, "Mimicking Human Camera Operators," 2015 IEEE Winter Conference on Applications of Computer Vision, 2015, pp. 215-222, doi: 10.1109/WACV.2015.36. (Year: 2015).
Johnson et al, "Pulse-Coupled Neural Nets: Translation, Rotation, Scale, Distortion, and Intensity Signal Invariance for Images", Applied Optics, vol. 33, No. 26, 1994, pp. 6239-6253.
Joubert, Niels, et al. "Towards a drone cinematographer: Guiding quadrotor cameras using visual composition principles." arXivpreprint arXiv: 1610.01691 (2016). (Year: 2916).
Lau et al., "Semantic Web Service Adaptation Model for a Pervasive Learning Scenario", 2008 IEEE Conference on Innovative Technologies in Intelligent Systems and Industrial Applications, 2008, pp. 98-103.
Li et al ("Matching Commercial Clips from TV Streams Using a Unique, Robust and Compact Signature" 2005) (Year: 2005).
Li, Yijun, Jesse S. Jin, and Xiaofang Zhou. "Matching commercial clips from TV streams using a unique, robust and compactsignature." Digital Image Computing: Techniques and Applications (DICTA'05). IEEE, 2005. (Year: 2005).
Lin et al., "Generating robust digital signature for image/video authentication", Multimedia and Security Workshop at ACM Multimedia '98, Bristol, U.K., Sep. 1998, pp. 245-251.
Lu et al, "Structural Digital Signature for Image Authentication: An Incidental Distortion Resistant Scheme", IEEE Transactions on Multimedia, vol. 5, No. 2, Jun. 2003, pp. 161-173.
Lyon, "Computational Models of Neural Auditory Processing", IEEE International Conference on Acoustics, Speech, and Signal Processing, ICASSP '84, Date of Conference: Mar. 1984, vol. 9, pp. 41-44.
M. Gschwindt,, "Can a Robot Become a Movie Director? Learning Artistic Principles for Aerial Cinematography," 2019 EEE/RSJw International Conference on Intelligent Robots and Systems (IROS), 2019, pp. 1107-1114, doi: 10.1109/IROS40897.2019.896759 (Year: 2019).
Ma Et El "Semantics modeling based image retrieval system using neural networks", 2005.
Marian Stewart B et al., "Independent component representations for face recognition", Proceedings of the SPIE Symposium on Electronic Imaging: Science and Technology; Conference on Human Vision and Electronic Imaging III, San Jose, California, Jan. 1998, pp. 1-12.
May et al, "The Transputer", Springer-Verlag Berlin Heidelberg 1989, vol. 41.
McNamara et al., "Diversity Decay in opportunistic Content Sharing Systems", 2011 IEEE International Symposium on a World of Wireless, Mobile and Multimedia Networks, pp. 1-3.

(56) References Cited

OTHER PUBLICATIONS

Morad et al., "Performance, Power Efficiency and Scalability of Asymmetric Cluster Chip Multiprocessors", Computer Architecture Letters, vol. 4, Jul. 4, 2005, pp. 1-4, XP002466254.

Nagy et al, "A Transputer, Based, Flexible, Real-Time Control System for Robotic Manipulators", UKACC International Conference on Control '96, Sep. 2-5, 1996, Conference Publication No. 427, IEE 1996.

Natschlager et al., "The "Liquid Computer": A novel strategy for real-time computing on time series", Special Issue on Foundations of Information Processing of telematik, vol. 8, No. 1, 2002, pp. 39-43, XP002466253.

Odinaev et al, "Cliques in Neural Ensembles as Perception Carriers", Technion—Institute of Technology, 2006 International Joint Conference on neural Networks, Canada, 2006, pp. 285-292.

Ortiz-Boyer et al, "CIXL2: A Crossover Operator for Evolutionary Algorithms Based on Population Features", Journal of Artificial Intelligence Research 24 (2005) Submitted Nov. 2004; published Jul. 2005, pp. 1-48.

Pandya etal. A Survey on QR Codes: in context of Research and Application. International Journal of Emerging Technology and U Advanced Engineering. ISSN 2250-2459, ISO 9001:2008 Certified Journal, vol. 4, Issue 3, Mar. 2014 (Year: 2014).

Queluz, "Content-Based Integrity Protection of Digital Images", SPIE Conf. on Security and Watermarking of Multimedia Contents, San Jose, Jan. 1999, pp. 85-93.

Retrieval, Story. Ehsan Younessian. Diss. Nanyang Technological University, 2013: i-187 (Year: 2013).

Rui, Yong et al. "Relevance feedback: a power tool for interactive content-based image retrieval." IEEE Transactions on circuits and systems for video technology 8.5 (1998): 644-655.

Santos et al., "SCORM-MPEG: an Ontology of Interoperable Metadata for multimediaand E-Learning", 23rd International Conference on Software, Telecommunications and Computer Networks (SoftCom), 2015, pp. 224-228.

Scheper et al, "Nonlinear dynamics in neural computation", ESANN'2006 proceedings—European Symposium on Artificial Neural Networks, Bruges (Belgium), Apr. 26-28, 2006, d-side publication, ISBN 2-930307-06-4, pp. 1-12.

Schneider et al, "A Robust Content based Digital Signature for Image Authentication", Proc. ICIP 1996, Lausane, Switzerland, Oct. 1996, pp. 227-230.

Srihari et al., "Intelligent Indexing and Semantic Retrieval of Multimodal Documents", Kluwer Academic Publishers, May 2000, vol. 2, Issue 2-3, pp. 245-275.

Brihari, Rohini K. "Automatic indexing and content-based retrieval of captioned images" Computer 0 (1995): 49-56.

Stolberg et al ("Hibrid-SOC: A Multi-Core SOC Architecture for Multimedia Signal Processing" 2003).

Stolberg et al, "Hibrid-Soc: A Mul Ti-Core Soc Architecture for Mul Timedia Signal Processing", 2003 IEEE, pp. 189-194.

\* cited by examiner

CONFIGURING AN ACTIVE SUSPENSION

BACKGROUND

An active suspension is a type of automotive suspension on a vehicle. It uses an onboard system to control the vertical movement of the vehicle's wheels relative to the suspension or vehicle body rather than the passive suspension provided by large springs where the movement is determined entirely by the road surface. So-called active suspensions are divided into two classes: real active suspensions, and adaptive or semi-active suspensions. While adaptive suspensions only vary shock absorber firmness to match changing road or dynamic conditions, active suspensions use some type of actuator to raise and lower the suspension independently at each wheel. See wikipedia.org.

These technologies allow car manufacturers to achieve a greater degree of ride quality and car handling by keeping the tires perpendicular to the road in corners, allowing better traction and control. An onboard computer detects body movement from sensors throughout the vehicle and, using that data, controls the action of the active and semi-active suspensions. The system virtually eliminates body roll and pitch variation in many driving situations including cornering, accelerating, and braking.

An active suspension reacts to a road element after the vehicle encountered the road element. Given the finite response period of the active suspension—bad road conditions may cause a discomfort to persons within the cabin of the vehicle.

There is a growing need to reduce the discomfort.

SUMMARY

There may be provided systems, methods and computer readable medium as illustrated in the specification.

BRIEF DESCRIPTION OF THE DRAWINGS

The embodiments of the disclosure will be understood and appreciated more fully from the following detailed description, taken in conjunction with the drawings in which.

DESCRIPTION OF EXAMPLE EMBODIMENTS

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

Because the illustrated embodiments of the present invention may for the most part, be implemented using electronic components and circuits known to those skilled in the art, details will not be explained in any greater extent than that considered necessary as illustrated above, for the understanding and appreciation of the underlying concepts of the present invention and in order not to obfuscate or distract from the teachings of the present invention.

Any reference in the specification to a method should be applied mutatis mutandis to a device or system capable of executing the method and/or to a non-transitory computer readable medium that stores instructions for executing the method.

Any reference in the specification to a system or device should be applied mutatis mutandis to a method that may be executed by the system, and/or may be applied mutatis mutandis to non-transitory computer readable medium that stores instructions executable by the system.

Any reference in the specification to a non-transitory computer readable medium should be applied mutatis mutandis to a device or system capable of executing instructions stored in the non-transitory computer readable medium and/or may be applied mutatis mutandis to a method for executing the instructions.

Any combination of any module or unit listed in any of the figures, any part of the specification and/or any claims may be provided.

The specification and/or drawings may refer to an image. An image is an example of a media unit. Any reference to an image may be applied mutatis mutandis to a media unit. A media unit may be an example of sensed information unit. Any reference to a media unit may be applied mutatis mutandis to sensed information. The sensed information may be sensed by any type of sensors—such as a visual light camera, or a sensor that may sense infrared, radar imagery, ultrasound, electro-optics, radiography, LIDAR (light detection and ranging), etc.

The specification and/or drawings may refer to a processor. The processor may be a processing circuitry. The processing circuitry may be implemented as a central processing unit (CPU), and/or one or more other integrated circuits such as application-specific integrated circuits (ASICs), field programmable gate arrays (FPGAs), full-custom integrated circuits, etc., or a combination of such integrated circuits.

Any combination of any steps of any method illustrated in the specification and/or drawings may be provided.

Any combination of any subject matter of any of claims may be provided.

Any combinations of systems, units, components, processors, sensors, illustrated in the specification and/or drawings may be provided.

The analysis of content of a media unit may be executed by generating a signature of the media unit and by comparing the signature to reference signatures. The reference signatures may be arranged in one or more concept structures or may be arranged in any other manner. The signatures may be used for object detection or for any other use.

The term "substantially" means insignificant deviation—for example differences that do not exceed few percent of a value, differences that are below the accuracy and/or resolution related to the face recognition process. What is substantially may be defined in any manner.

There may be provided a system, method and non-transitory computer readable medium for adapting a configurable suspension to provide a desired comfort level to humans (driver, passengers) with the cabin of the vehicle. The adaptation is made, at least in part, based on the road segment that precedes the vehicle.

Figure 1:
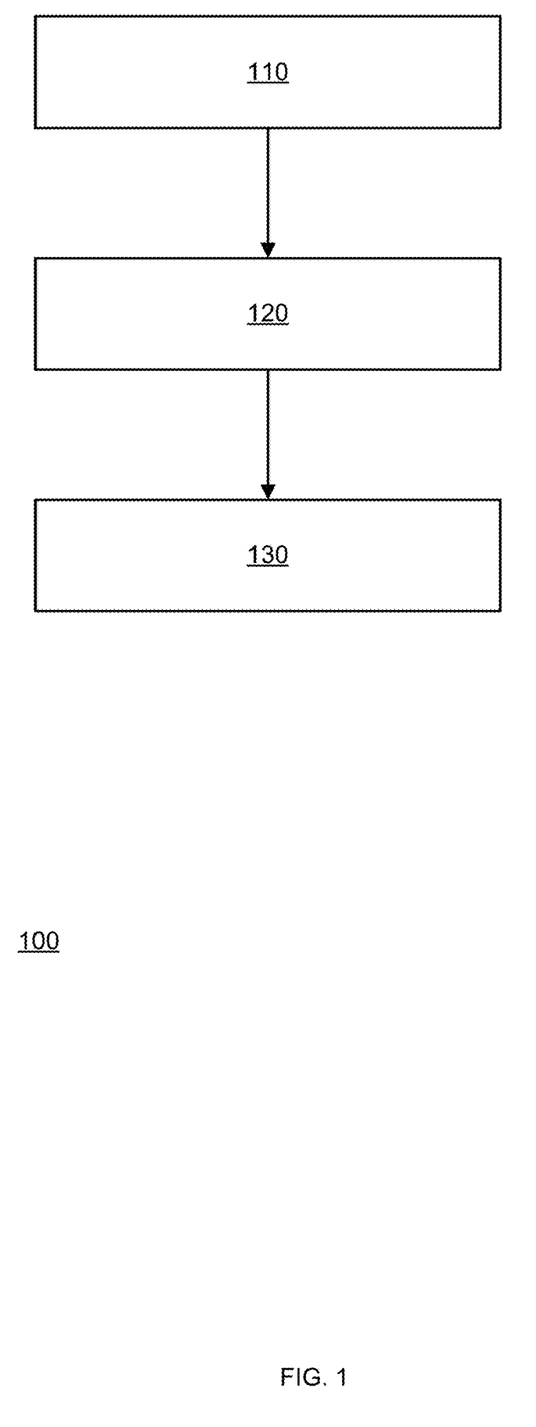
FIG. 1 illustrates an example of a method.

FIG. 1 illustrates a method 100 for configuring a configurable suspension.

Method 100 may start by step 110 of obtaining acquired sensed information that represent (a) one or more driving parameters of the vehicle, (b) one or more vehicle cabin disturbance parameters, (c) a configuration of a configurable suspension, and (d) a road segment that precedes the vehicle.

The one or more driving parameters may include, for example, at least one out of a speed, an acceleration, a direction of progress, a current.

The one or more vehicle cabin disturbance parameters may include any acquired sensed information indicative of a disturbance within the cabin—for example noise, vibrations. And the like. The disturbance is any factor that can be measured that can affect the comfort of a human within the cabin of the vehicle.

The road segment that precedes the vehicle can be within few centimeters, few meters, few tens of meters and even more before the vehicle.

Step 110 may be followed by step 120 of selecting, out of multiple configurations of the configurable suspension, a selected configuration that one applied will attribute to obtain a desired human-in-vehicle comfort value.

The selected configuration may be a configuration of one or more configurable elements of the suspension.

The selected configuration, or a combination of the selected configuration and at least one other parameter (for example one or more driving parameters) once applied may result in the desired human-in-vehicle comfort value.

Setting the configuration of the configurable suspension may provide the desired human-in-vehicle comfort value under some driving conditions—but may not be enough to obtain the desired goal under other driving conditions. In the latter case both the driving parameter and the configuration of the configurable suspension may be changed.

For example—if the vehicle approaches a bump as a speed of 20 miles per hour—a correctly configured suspension may enable to pass the bump while maintaining the desired human-in-vehicle comfort value.

Yet for another example—when approaching the same bump at a speed of 60 miles per hour—then even a correctly configured configurable suspension may not provide the desired human-in-vehicle comfort value—and the vehicle must slow before reaching the bump.

The same applies to a hole in the road that may be bypassed (or passed at a very slow progress) in order to maintain the desired human-in-vehicle comfort value.

Step 120 may include obtaining a mapping between values of at least a part of the acquired sensed information and human-in-vehicle comfort values. And using the mapping to determine the selected configuration.

The at least part of the acquired sensed information may include, for example, the driving parameters and the road segment that precedes the vehicle.

Alternatively, step 120 may include (a) obtaining a first mapping between the one or more vehicle cabin disturbance parameters and human-in-vehicle comfort values, and (b) obtaining a second mapping between the one or more vehicle cabin disturbance parameter and other parts of the acquired sensed information.

The first mapping may be obtained in any manner—and even regardless of the obtaining of the second mapping.

The other parts of the acquired sensed information may include, for example, the driving parameters and the road segment that precedes the vehicle.

A human-in-vehicle comfort parameter is a parameter that reflects the comfort of a person within the cabin of the vehicle. If there are more than a single persons in the vehicle the comfort of one or more of these persons may be taken into account—for example taking into account the worst discomfort to any of the persons, assigning more weight to the comfort level of the driver, and the like.

The desired human-in-vehicle comfort value can be determined in any manner—without any feedback from a human, based on feedback from a human, based on responses of a person within the cabin to disturbances, and the like. The response of the human may be any biometric/physiological indication of discomfort—such a facial expression, stress indicator, verbal input indicative of discomfort, and the like.

Step 120 may be followed by step 130 of triggering or requesting a setting of the configurable suspension to a configuration of the one or more configurations.

If there is no need to change the current configuration of the suspension—then the current configuration maintains as is.

The computerized system that executes method 100 may control the configurable suspension, with or without any human feedback or intervention and thus it may request or command the setting of the configurable suspension.

Alternatively—if the computerized system that executes method 100 may control the configurable suspension it may request for the unit that controls the suspension to change the configuration.

The change of the configuration and/or change of the driving condition may occur before reaching a road element that may justify the change.

A non-limiting example of a configuration may include—during turning left the system detects potholes in the road, it sends this information along with the distance and size details to ECU, then the ECU sends an urgent message to the servo atop the right-front coil spring to "stiffen up".

To accomplish this, an engine-driven oil pump sends additional fluid to the servo, which increases spring tension, thereby reducing body roll, yaw, and spring oscillation.

A similar message, but of a slightly less intense nature, is sent to the servo atop the right-rear coil spring, with similar results.

At the same time, another set of actuators kicks in to temporarily increase the rigidity of the suspension dampers on the right-front and rear corners of the car.

Figure 2:
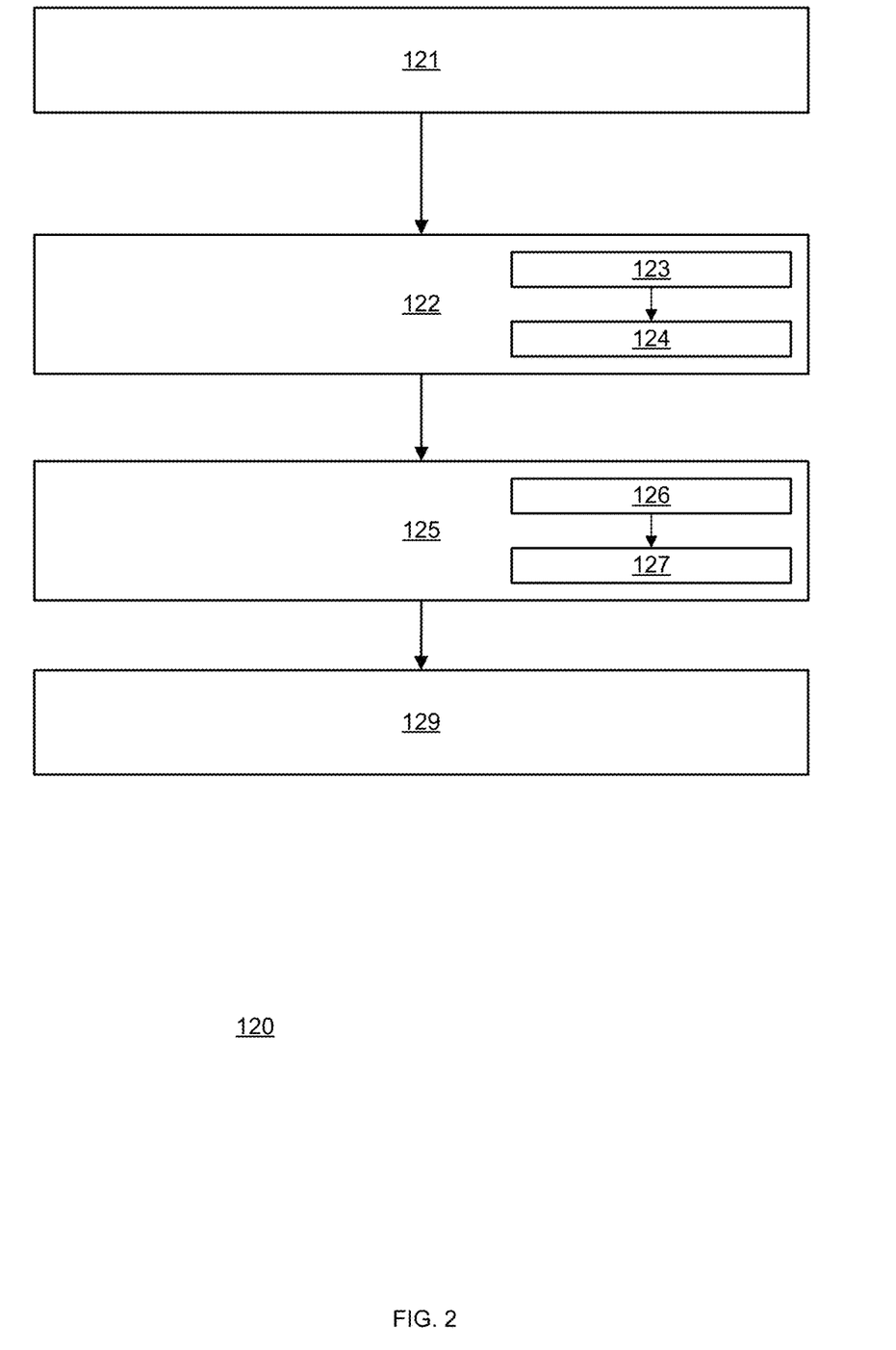
FIG. 2 illustrates an example of a step of the method of FIG. 1.

FIG. 2 illustrates an example of step 120 of method 100.

Step 120 is preceded by obtaining acquired sensed information that represent (a) one or more driving parameters of the vehicle, (b) one or more vehicle cabin disturbance parameters, (c) a configuration of a configurable suspension, and (d) a road segment that precedes the vehicle.

The acquired sensed information may include a road-disturbance part that includes the one or more vehicle cabin disturbance parameters, and the one or more road segment that precedes the vehicle.

Step 120 may include step 121 of obtaining multiple reference data structures. Each reference data structure may include a road-disturbance part of reference sensed information and is associated with a human-in-vehicle comfort value.

The obtaining may include generating at least one reference data structure, retrieving or otherwise receiving at least one reference data structure, storing at least one reference data structure, accessing at least one reference data structure, and the like.

The reference data structures may be clusters, but this is not necessarily so.

The clusters may be generated, at least in part, using a machine learning process.

The machine learning process may be an unsupervised machine learning process or a supervised machine learning process.

A method for generating signatures is illustrated in U.S. patent application Ser. No. 16/544,940 filing date 20 Aug. 2019 which is incorporated herein by reference.

Step 121 may be followed by step 122 of searching, out of the multiple reference data structures, for relevant reference data structures.

Each relevant reference data structure includes a road-disturbance part of reference sensed information that is similar to the road-disturbance part of the acquired sensed information.

The similarity can be determined in any manner—for example one or more types of distances between feature vectors that represent the road-disturbance parts of the acquired (during step 120) sensed information and the reference sensed information respectively.

Each relevant reference data structure is also associated (may include, may be linked to or otherwise associated with) with reference sensed information regarding a reference configuration of the configurable suspension.

Step 122 may include steps 123 and 124.

Step 123 may include generating a signature of the road-disturbance part of the acquired sensed information.

Step 123 may be followed by step 124 of searching for one or more relevant reference data structures.

Each relevant reference data structure may include at least one reference signature that is similar to the signature of the road-disturbance part of the acquired sensed information.

Step 122 may be followed by step 125 of selecting a selected reference data structure out of the relevant reference data structures. Any selection method may be provided—for example selecting the most similar relevant reference data structure of the relevant reference data structures.

Step 125 may include step 126 of selecting the selected reference data structure that is associated with a best human-in-vehicle comfort value out of the human-in-vehicle comfort values of the relevant reference data structures.

Each relevant reference data structure may include reference sensed information that represents one or more driving parameters of the vehicle. Each relevant reference data structure is also associated with reference sensed information regarding a reference configuration of the configurable suspension.

Step 125 may include step 127 of selecting a selected reference data structure out of the relevant reference data structures, wherein the selecting is based on a combination of at least two out of (i) reference sensed information that represents one or more driving parameters of the vehicle, (ii) human-in-vehicle comfort values of the relevant reference data structures, and (iii) reference sensed information regarding a reference configuration of the configurable suspension.

Step 126 may be followed by step 129 of defining the reference configuration of the configurable suspension of the selected reference data structure as the selected configuration of the configurable suspension.

Figure 3:
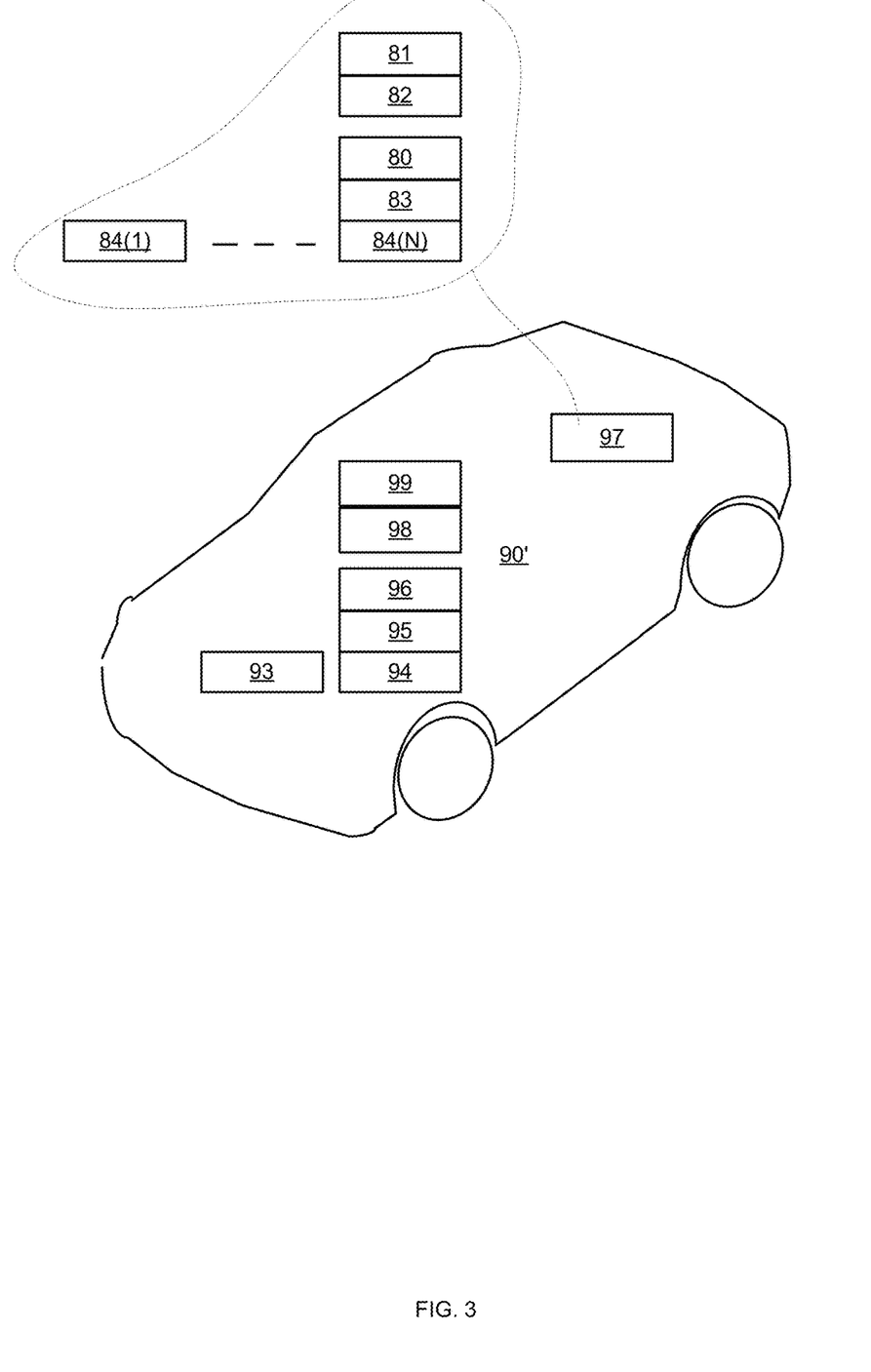
FIG. 3 illustrates an example of a vehicle.

FIG. 3 illustrates a vehicle 90 that includes one or more sensors (collectively denoted 93) for sensing acquired sensed information (for example the acquired sensed information obtained in step 110 of FIG. 1).

The vehicle 90 may also include configurable suspension 94, a processor 99, a vehicle controller 98 (for example for controlling the configurable suspension), a memory unit 97, one or more vehicle computers—such autonomous driving controller or ADAS computer 96, and a communication unit 95 for communicating with other vehicles and/or a remote computer system such as a cloud computer.

The memory unit 97 may store any data structures such any mappings illustrated in the specification—for example a mapping 80 between values of at least a part of the acquired sensed information and human-in-vehicle comfort values.

Alternatively—the memory unit 97 may store a first mapping 81 between the one or more vehicle cabin disturbance parameters and human-in-vehicle comfort values, and a second mapping 82 between the one or more vehicle cabin disturbance parameter and other parts of the acquired sensed information.

The memory unit 97 may store acquired sensed information 83, reference data structures 84(1)-84(N) that store reference information such as reference sensed information.

There may be provide a system, method and computer readable medium that aim to configure the configurable suspension (and may also amend one or more other parameters such as one or more other driving parameters) that is responsive to one or more vehicle disturbance parameter—and not to the desired human-in-vehicle comfort value.

Method 100 may modified to fit a desired value (or values) of the one or more vehicle disturbance parameter.

This method may include:

Obtaining acquired sensed information that represent (a) one or more driving parameters of the vehicle, (b) a configuration of a configurable suspension, and (c) a road segment that precedes the vehicle. The sensed information may or may not include sensed information regarding one or more vehicle cabin disturbance parameters.

selecting, out of multiple configurations of the configurable suspension, a selected configuration that one applied will attribute to obtain one or more desired values of one or more vehicle cabin disturbance parameters; and triggering or requesting a setting of the configurable suspension to a configuration of the one or more configurations.

While the foregoing written description of the invention enables one of ordinary skill to make and use what is considered presently to be the best mode thereof, those of ordinary skill will understand and appreciate the existence of variations, combinations, and equivalents of the specific embodiment, method, and examples herein. The invention should therefore not be limited by the above described embodiment, method, and examples, but by all embodiments and methods within the scope and spirit of the invention as claimed.

In the foregoing specification, the invention has been described with reference to specific examples of embodiments of the invention. It will, however, be evident that various modifications and changes may be made therein without departing from the broader spirit and scope of the invention as set forth in the appended claims.

Moreover, the terms "front," "back," "top," "bottom," "over," "under" and the like in the description and in the claims, if any, are used for descriptive purposes and not necessarily for describing permanent relative positions. It is understood that the terms so used are interchangeable under appropriate circumstances such that the embodiments of the invention described herein are, for example, capable of operation in other orientations than those illustrated or otherwise described herein.

Furthermore, the terms "assert" or "set" and "negate" (or "deassert" or "clear") are used herein when referring to the rendering of a signal, status bit, or similar apparatus into its logically true or logically false state, respectively. If the logically true state is a logic level one, the logically false state is a logic level zero. And if the logically true state is a logic level zero, the logically false state is a logic level one.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of components to achieve the same functionality is effectively "associated" such that the desired functionality is achieved. Hence, any two components herein combined to achieve a particular functionality may be seen as "associated with" each other such that the desired functionality is achieved, irrespective of architectures or intermedial components. Likewise, any two components so associated can also be viewed as being "operably connected," or "operably coupled," to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

Also for example, in one embodiment, the illustrated examples may be implemented as circuitry located on a single integrated circuit or within the same device. Alternatively, the examples may be implemented as any number of separate integrated circuits or separate devices interconnected with each other in a suitable manner.

However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or steps then those listed in a claim. Furthermore, the terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

It is appreciated that various features of the embodiments of the disclosure which are, for clarity, described in the contexts of separate embodiments may also be provided in combination in a single embodiment. Conversely, various features of the embodiments of the disclosure which are, for brevity, described in the context of a single embodiment may also be provided separately or in any suitable sub-combination.

It will be appreciated by persons skilled in the art that the embodiments of the disclosure are not limited by what has been particularly shown and described hereinabove. Rather the scope of the embodiments of the disclosure is defined by the appended claims and equivalents thereof.

We claim:

1. A method for configuring a configurable suspension, the method comprises:
    obtaining sensed information that represents (a) driving parameters of a vehicle, (b) vehicle cabin disturbance parameters, (c) configurations of a configurable suspension, and (d) a road segment that precedes the vehicle;
    obtaining reference data structures, each reference data structure (i) comprises a reference vehicle disturbance parameters and reference road segment information, and (ii) is associated with a human-in-vehicle comfort value; wherein the reference data structures are clusters that are generated based, at least in part, on using a machine learning process;
    determining, based on the configurations of the configurable suspension and according to feedback from a human associated with a human-in-vehicle comfort value, a selected configuration that once applied will attribute to the human-in-vehicle comfort value; and
    commanding a computerized unit that controls a configuration of the configurable suspension to set the configuration of the configurable suspension according to the selected configuration.

2. The method according to claim 1 comprising obtaining a mapping between values of at least a part of the sensed information and human-in-vehicle comfort values.

3. The method according to claim 1 comprising obtaining a first mapping between the one or more vehicle cabin disturbance parameters and human-in-vehicle comfort values, and obtaining a second mapping between the one or more vehicle cabin disturbance parameter and other parts of the sensed information, wherein the first mapping is separated from the second mapping.

4. The method according to claim 1, comprising obtaining the sensed information while the configurable suspension is at a current configuration, wherein when the selected configuration differs from the current configuration then triggering or requesting a change in the configuration of the configurable suspension.

5. The method according to claim 1, comprising determining whether to introduce a change in at least one driving parameter of the one or more driving parameters of the vehicle so that the change in the at least one driving parameter and the selected configuration, once applied, will attribute to the provision of the value of the human comfort value.

6. The method according to claim 5, comprising triggering or requesting the change of the at least one driving parameter when determining to introduce the change.

7. The method according to claim 1, comprising searching, out of the multiple reference data structures, for relevant reference data structures, each relevant reference data structure comprises a road-disturbance part of reference sensed information that is similar to the road-disturbance part of the acquired sensed information, wherein a similarity between the road-disturbance part of reference sensed information and the road-disturbance part of the acquired sensed information is a distance between a feature vector that represents the road-disturbance part of reference sensed information and a feature vector that represents the road-disturbance part of the acquired sensed information.

8. The method according to claim 7 wherein each relevant reference data structure is also associated with reference sensed information regarding a reference configuration of the configurable suspension; wherein the method comprises, selecting a selected reference data structure out of the relevant reference data structures.

9. The method according to claim 8 wherein the selecting comprises selecting the selected reference data structure that is associated with a best human-in-vehicle comfort value out of the human-in-vehicle comfort values of the relevant reference data structures.

10. The method according to claim 7 wherein each relevant reference data structure comprises reference sensed information that represents one or more driving parameters of the vehicle, wherein each relevant reference data structure is also associated with reference sensed information regarding a reference configuration of the configurable suspension.

11. The method according to claim 10 wherein the method comprises, selecting a selected reference data structure out of the relevant reference data structures, wherein the selecting is based on a combination of at least two out of (i) reference sensed information that represents one or more driving parameters of the vehicle, (ii) human-in-vehicle comfort values of the relevant reference data structures, and (iii) reference sensed information regarding a reference configuration of the configurable suspension.

12. The method according to claim 1 wherein the machine learning process is an unsupervised machine learning process.

13. The method according to claim 1 comprising generating a signature of the road-disturbance part of the acquired sensed information; and searching for one or more relevant reference data structures, wherein each relevant reference data structure comprises at least one reference signature that is similar to the signature of the road-disturbance part of the acquired sensed information.

14. A non-transitory computer readable medium, the non-transitory computer readable medium stores instructions for:
obtaining sensed information that represents (a) driving parameters of a vehicle, (b) vehicle cabin disturbance parameters, (c) configurations of a configurable suspension, and (d) a road segment that precedes the vehicle;
obtaining reference data structures, each reference data structure (i) comprises a reference vehicle disturbance parameters and reference road segment information, and (ii) is associated with a human-in-vehicle comfort value; wherein the reference data structures are clusters that are generated based, at least in part, on using a machine learning process;
determining, based on the configurations of the configurable suspension and according to feedback from a human associated with a human-in-vehicle comfort value, a selected configuration that once applied will attribute to the human-in-vehicle comfort value; and
commanding a computerized unit that controls a configuration of the configurable suspension to set the configuration of the configurable suspension according to the selected configuration.

15. A computerized system comprising a processor that is configured to:
obtain sensed information that represents (a) driving parameters of a vehicle, (b) vehicle cabin disturbance parameters, (c) configurations of a configurable suspension, and (d) a road segment that precedes the vehicle;
obtain reference data structures, each reference data structure (i) comprises a reference vehicle disturbance parameters and reference road segment information, and (ii) is associated with a human-in-vehicle comfort value; wherein the reference data structures are clusters that are generated based, at least in part, on using a machine learning process;
determine, based on the configurations of the configurable suspension and according to feedback from a human associated with a human-in-vehicle comfort value, a selected configuration that once applied will attribute to the human-in-vehicle comfort value; and
commanding a computerized unit that controls a configuration of the configurable suspension to set the configuration of the configurable suspension according to the selected configuration.

* * * * *